United States Patent
Asahi et al.

(10) Patent No.: US 7,429,076 B2
(45) Date of Patent: Sep. 30, 2008

(54) VEHICLE REAR BODY STRUCTURE OF AUTOMOTIVE VEHICLE

(75) Inventors: Masahiro Asahi, Hiroshima (JP); Manabu Tamura, Hiroshima (JP); Hiroshi Tanaka, Hiroshima (JP); Takayuki Sunakawa, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/493,516

(22) Filed: Jul. 27, 2006

(65) Prior Publication Data
US 2007/0029841 A1    Feb. 8, 2007

(30) Foreign Application Priority Data
Aug. 3, 2005    (JP) .............................. 2005-225162

(51) Int. Cl.
B62D 21/15    (2006.01)
B62D 25/08    (2006.01)

(52) U.S. Cl. ................................. 296/203.04
(58) Field of Classification Search ............ 296/203.04, 296/203.01, 204, 187.01, 187.11, 193.07, 296/193.08
See application file for complete search history.

(56) References Cited
U.S. PATENT DOCUMENTS
5,419,609 A    5/1995    Kmiec et al.

| 2005/0212334 | A1* | 9/2005 | Murata et al. ................ 296/204 |
| 2006/0061142 | A1* | 3/2006 | Kobayashi et al. ..... 296/203.04 |
| 2006/0087156 | A1* | 4/2006 | Kobayashi et al. ..... 296/203.01 |
| 2007/0114815 | A1* | 5/2007 | Egawa et al. ........... 296/203.04 |
| 2007/0158977 | A1* | 7/2007 | Yasukouchi et al. .... 296/203.04 |

FOREIGN PATENT DOCUMENTS
JP    2004-322822    11/2004
JP    2004322822    11/2004

OTHER PUBLICATIONS
European Search Report application EP 06 01 5822 dated Jul. 18, 2007.

* cited by examiner

*Primary Examiner*—H Gutman
(74) *Attorney, Agent, or Firm*—Studebaker & Brackett PC; Donald R. Studebaker

(57) ABSTRACT

In a vehicle rear body structure of an automotive vehicle, there are provided the reinforcing members that are provided at the lower face of the floor panel at portions outside the spare tire pan and form with the floor panel the closed cross sections that extend longitudinally in parallel to the rear side frames. The closed cross sections are formed with the reinforcing members and the upper end-side curve portions located outside the spare tire pan, and located substantially at the same height-level as the rear side frames. Thereby, absorption of the impact energy at the vehicle crash can be improved and an improper weight increase can be suppressed.

7 Claims, 3 Drawing Sheets

VEHICLE REAR BODY STRUCTURE OF AUTOMOTIVE VEHICLE

BACKGROUND OF THE INVENTION

The present invention relates to a vehicle rear body structure of an automotive vehicle, particularly to the one that can properly improve absorption of an impact energy that acts on a vehicle rear body at a vehicle rear crash.

Generally, a vehicle rear body structure in which a pair of rear side frames is provided at both sides of the vehicle and a bumper beam extending in a vehicle width direction is attached to respective rear end portions of these rear side frames via respective crash cans operative to absorb an impact energy has been widely applied to automotive vehicles. When the vehicle has a rear crash, the crash cans are crashed with impact loads that are transmitted via the bumper beam and thereby the crash impact energy can be absorbed. The crash impact energy can be also absorbed by the rear side frames having their compressive deformations. Thus, the impact transmitted to a vehicle cabin can be absorbed properly at the vehicle rear crash.

Meanwhile, a structure in which a reinforcing member is provided at the vehicle rear body to increase a rigidity of the vehicle rear body is also known. For example, Japanese Patent Application Laid-Open No. 2004-322822 discloses a vehicle rear body structure, in which a pair of rear side lower frames, functioning as reinforcing members, is provided at respective lower end portions located outside a box-shape spare tire pan, and the rear side lower frames and the spare tire pan form a pair of closed cross sections that extends longitudinally substantially in parallel to a pair of rear side frames and is located at a lower level than the rear side frames.

The bumper beam is generally attached to the rear end portions of the rear side frames via the crash cans as described above. In the vehicle rear body structure disclosed in the above-described patent publication, however, the rear side lower frames (reinforcing members) are located at the lower end portion of the spare tire pan, namely, at a considerably lower level than the rear side frames. For this reason, it would be rather difficult to attach the bumper beam to the rear end portions of the rear side lower frames.

Herein, the bumper beam having a greater vertical width may be applied so that the bumper beam could be attached to both the rear side frames and the rear side lower frames. However, in this case, the bumper beam would be a rather large-sized and heavy beam and therefore the manufacturing costs would improperly increase.

SUMMARY OF THE INVENTION

The present invention has been devised in view of the above-described problems, and an object of the present invention is to provide a vehicle rear body structure of an automotive vehicle that can improve absorption of the impact energy at the vehicle crash and suppress an improper weight increase.

According to the present invention, there is provided a vehicle rear body structure of an automotive vehicle, comprising a floor panel having a spare tire pan, the spare tire pan being formed at a portion that is located near a rear end of the floor panel, which is other than both-side portions of the floor panel, so as to project downward, a pair of rear side frames, the rear side frames being provided at a lower face of the floor panel at both sides so as to extend forward from a rear end of the vehicle, and a pair of reinforcing members, the reinforcing members being provided at the lower face of the floor panel at portions located outside the spare tire pan and forming with the floor panel closed cross sections that extend in a longitudinal direction of the vehicle substantially in parallel to the rear side frames, wherein the closed cross sections are formed with the reinforcing members and upper end-side curve portions of the floor panel located outside the spare tire pan, and the closed cross sections are located substantially at the same height-level as the rear side frames.

Thereby, the impact load transmitted via bumper beam at the vehicle rear crash can be received effectively by the rear side frames and the reinforcing members. Thus, the impact crash can be absorbed properly by respective compressive deformations of the rear side frames and reinforcing members, so absorption of the impact energy can be improved. Also, the reinforcing members can form the closed cross sections properly by taking advantage of the upper end-side curve portions of the floor panel, so a weight increase for reinforcing the vehicle rear body can be suppressed effectively.

According to an embodiment of the present invention, there is provided a cross member that is provided at the lower face of the floor panel at a portion in front of the spare tire pan and forms a closed cross section with the floor panel, and front end portions of the reinforcing members are connected to the cross member. Thereby, the impact load transmitted to the reinforcing members can be received by the cross member, so the absorption of the impact energy by the reinforcing members can be further improved.

According to another embodiment of the present invention, the vehicle rear body structure further comprises a pair of first crash cans that is fixed to rear end portions of the rear side frames respectively, a bumper beam that is attached to rear end portions of the first crash cans, and a pair of second crash cans that is provided inside the pair of first crash cans, respectively, wherein front ends of the second crash cans are fixed to the reinforcing members, respectively, and rear ends of the second crash cans are fixed to the bumper beam. Thereby, the impact energy absorption of the vehicle rear body structure can be further improved by the pair of second crash cans, and the impact load can be transmitted surely to the reinforcing members via the second crash cans. Herein, it is not necessary to increase the vertical width of the bumper beam improperly.

According to another embodiment of the present invention, there are provided flange plates that interconnect font end portions of the first crash cans and the front end portions of the second crash cans, and rear ends of the rear side frames and rear ends of the reinforcing members are connected to the flange plates, respectively. Thereby, even when the vehicle has a rear-oblique crash (a rear crash from a side of the first crash can), the crash load is transmitted from the bumper beam to the rear side frame via the first crash can, and the crash load is also transmitted to the reinforcing member via the flange plate. Thus, the impact energy absorption for the vehicle rear-oblique crash can be improved as well.

According to another embodiment of the present invention, there are provided first flange portions at the rear ends of the rear side frames and second flange portions at the rear ends of the reinforcing members, and the first and second flange portions are fixed to the flange members, whereby the rear side frames and first crash cans are interconnected and the reinforcing members and second crash cans are interconnected. Thereby, interconnection of the rear side frames and the first crash cans and interconnection of the reinforcing members and the second crash cans can be provided simply, and the number of parts for the interconnections can be reduced. Thus, manufacturing costs can be lowered as much as possible.

Other features, aspects, and advantages of the present invention will become apparent from the following description which refers to the accompanying drawings.

DETAILED DESCRIPTION OF THE INVENTION

Figure 1:
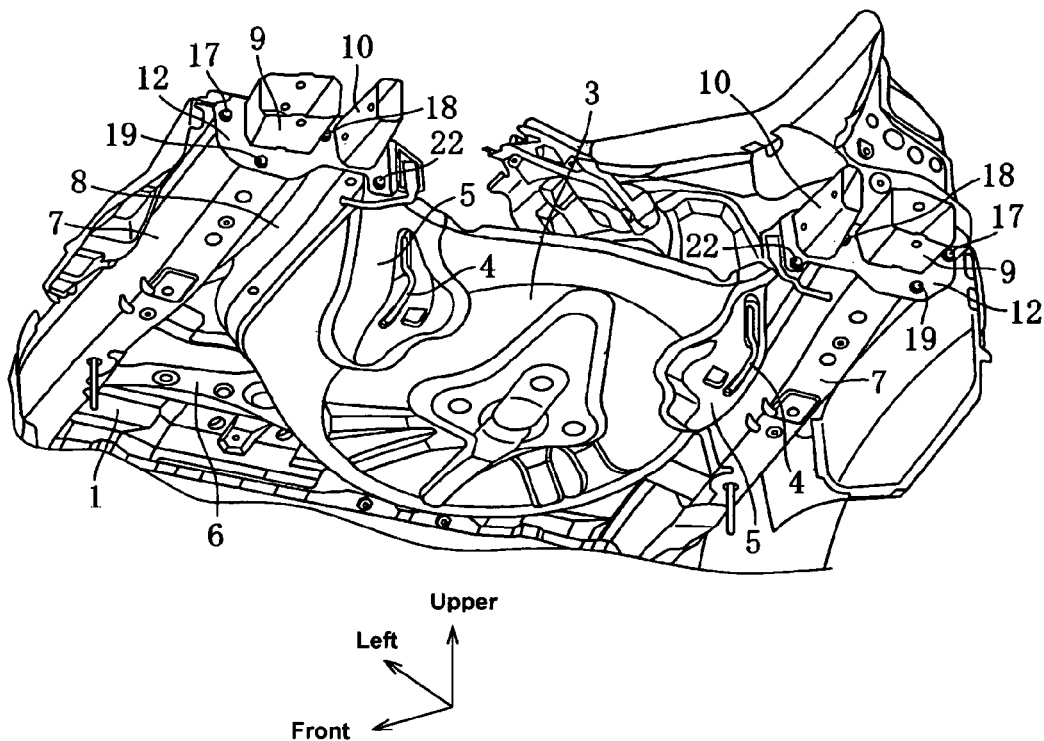
FIG. 1 is a bottom perspective view of a major part of a vehicle rear body structure of an automotive vehicle according an embodiment of the present invention.
Figure 2:
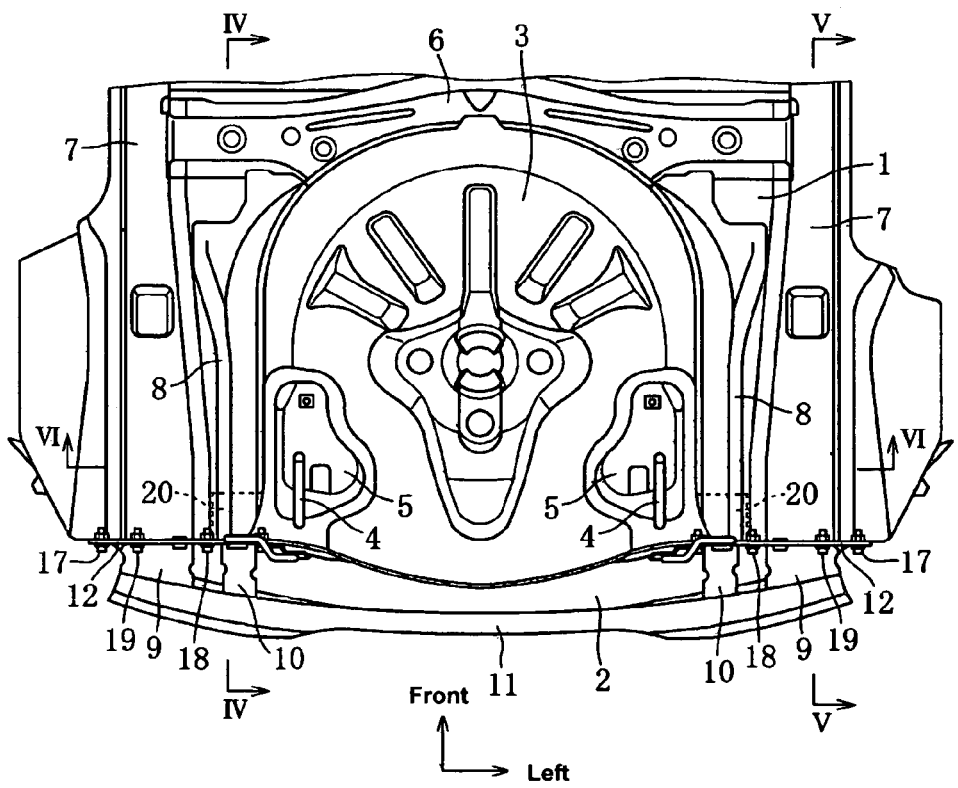
FIG. 2 is a bottom view of the vehicle rear body structure.
Figure 3:
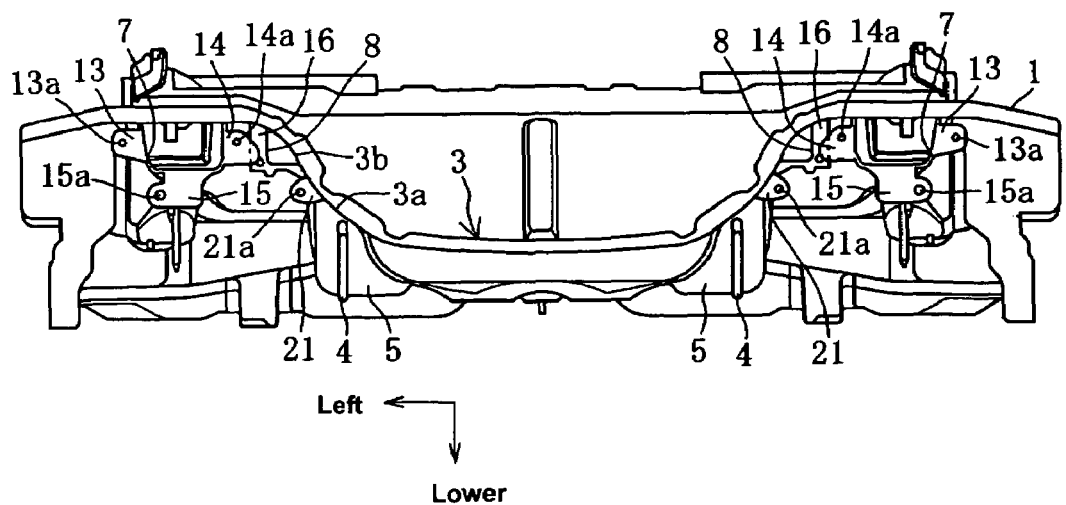
FIG. 3 is a back view of the major part of the vehicle rear body structure.
Figure 4:
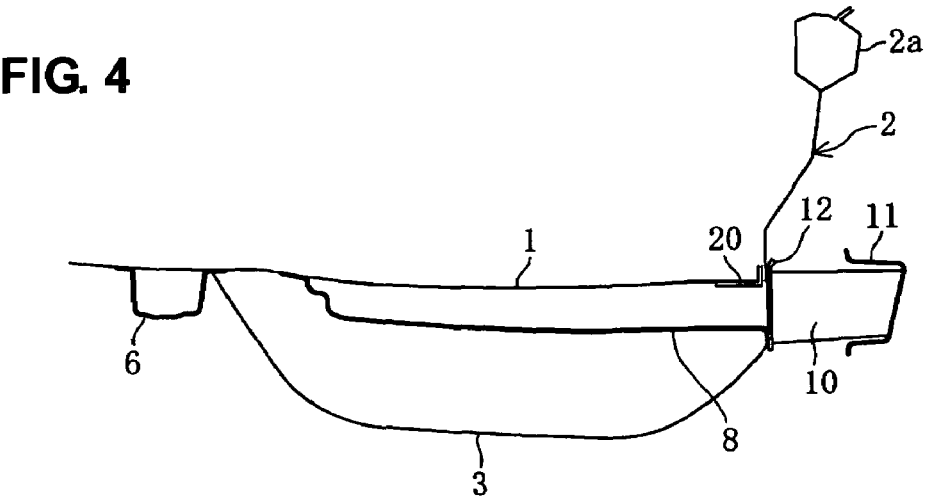
FIG. 4 is a sectional view taken along line V-V of FIG. 2.

Hereinafter, a preferred embodiment of the present invention will be described referring to the accompanying drawings. FIG. 1 is a bottom perspective view of a vehicle rear body structure without a bumper beam 11, FIG. 2 is a bottom view of the vehicle rear body structure, and FIG. 3 is a back view of the vehicle rear body structure without a rear end panel 2 and flange plates that will be described below.

As shown in FIGS. 1-6, the vehicle rear body structure of an automotive vehicle of the present embodiment comprises a floor panel 1, a rear end panel 2, a spare tire pan 3 that is formed so as to project downward from the floor panel 1, a pair of tie-down hooks 4 and tie-down-hook attaching reinforcing members 5, a cross member 6, a pair of rear side frames 7 that is provided so as to extend longitudinally, a pair of reinforcing members 8 that forms closed cross sections together with the spare tire pan 3, a pair of first crash cans 9, a pair of second crash cans 10, a bumper beam 11, and so on.

As shown in FIGS. 1-6, at a rear end portion of the floor panel 1 is provided the spare tire pan 3 that is of an elongated circular shape, when viewed from above. The spare tire pan 3 includes a lower curve portion 3a and an upper-end-side curve portion 3b. The lower curve portion 3a is formed with a gentle curve at a lower portion of the spare tire pan 3, and of an elongated circular shape, when viewed from above. The upper-end-side curve portion 3b is formed with a sharp curve at a portion near an upper end of the spare tire pan 3, and of an elongated circular shape, when viewed from above.

The cross member 6, which extends in a vehicle width direction, is fixed to a lower face of the floor panel 1 in front of the spare tire pan 3. The cross member 6 forms with the floor panel 1 a closed cross section that extends in the vehicle width direction, and its both sides are fixed to the rear side frame 7, respectively. At a rear end portion of the floor panel 1 is provided the rear end panel 2 that projects upward and extends in the vehicle width direction. A closed cross section 2a is formed at an upper end portion of the rear end panel 2.

Next, the rear side frames 7 will be described. As shown in FIGS. 1, 2, 5 and 6, the rear side frames 7 extending longitudinally are provided at both-side portions of the floor panel 1. The rear side frames 7 form closed cross sections with the floor panel 1.

The reinforcing members 8 extending longitudinally are provided at the lower face of the floor panel 1 at portions located outside the spare tire pan 3. Each of the reinforcing members 8 is comprised of a member with a L-shaped cross section that has a connecting flange. The reinforcing members 8 form with the floor panel 1 closed cross sections that extend in a longitudinal direction of the vehicle substantially in parallel to the rear side frames 7. Specifically, the reinforcing members 8 form the closed cross sections with the upper-end-side curve portion 3b of the floor panel 1 located outside the spare tire pan 3, and the closed cross sections are located substantially at the same height-level as the rear side frames 7.

At the both vehicle sides, the first crash cans 9 are fixed to rear ends of the rear side frames 7 via flange plates 12, the second crash cans 10 are fixed to rear ends of the reinforcing members 8 via the flange plates 12, and the bumper beam 11 is fixed to respective rear ends of the first and second crash cans 9, 10.

In the process of manufacturing the bumper beam 11, these crash cans 9, 10 are joined to the bumper beam 11, one of the plate-shaped flange plates 12 is joined to respective front ends of the left-side first and second crash cans 9, 10, and another plate-shaped flange plate 12 is joined to respective front ends of the right-side first and second crash cans 9, 10.

A rear half-part of each rear side frame 7 is made of a high-tension steel plate, and a rear half-part of each rear side frame 7 is made of a normal steel plate. As shown in FIG. 3, at the rear end portions of the rear side frames 7 are provided first flange portions 13, 14 and 15 that are bent at a right angle and project toward both sides and downward, respectively. These first flange portions 13, 14 and 15 have bolt holes 13a, 14a and 15a, respectively, and the flange plates 12 have bolt holes that correspond to the bolt holes 13a, 14a and 15a of the flange portions 13, 14 and 15. Herein, bolts 17, 18 and 19 are respectively inserted into these bolt holes from the rear and then respective nuts are fastened to these bolts from the front. Thereby, the flange plates 12 are fixed by bolt connections. Thus, the front ends of the first crash cans 9 are fixed to the rear-ends of the rear side frames 7 via the flange plates 12, and the bumper beam 11 is fixed to the rear ends of these first crash cans 9.

The reinforcing members 8 extending longitudinally are provided at the lower face of the floor panel 1 at portions located outside the spare tire pan 3. The reinforcing members 8 form, with the upper-end-side curve portion 3b located outside the spare tire pan 3, the closed cross sections extending in the longitudinal direction of the vehicle substantially in parallel to the rear side frames 7. These closed cross sections are located substantially at the same height-level as the rear side frames 7. Respective front end portions of the reinforcing members 8 are connected to the cross member 6 and a flange of the cross member 6, and the floor panel 1.

As shown in FIG. 3, at the rear end portion of each of the reinforcing members 8 is provided a second flange portion 16 that is bent at a right angle and projects outward. This second flange portion 16 is provided so as to lap over the above-described first flange portion 14 on the front side, and fastened to each of the flange plates 12. Thus, the front ends of the second crash cans 10 are fixed to the rear ends of the reinforcing members 8 via the flange plates 12, respectively, and the bumper beam 11 is fixed to the rear ends of the second crash cans 10.

Figure 5:
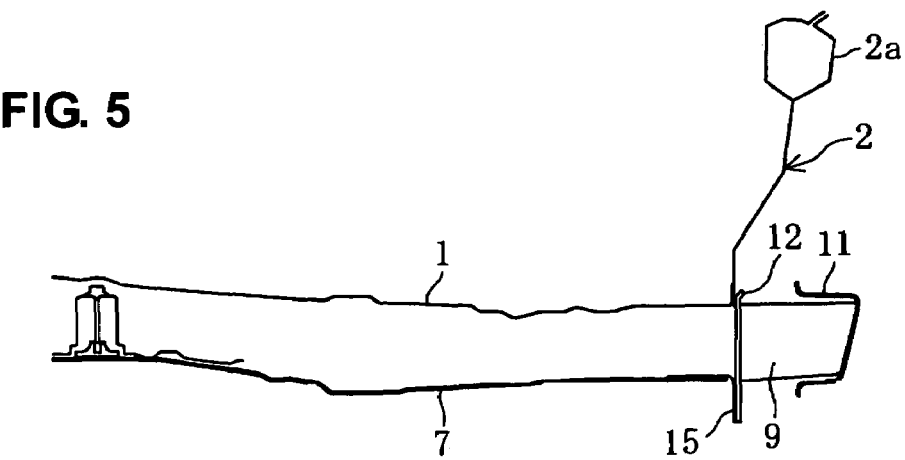
FIG. 5 is a sectional view taken along line IV-IV of FIG. 2.
Figure 6:
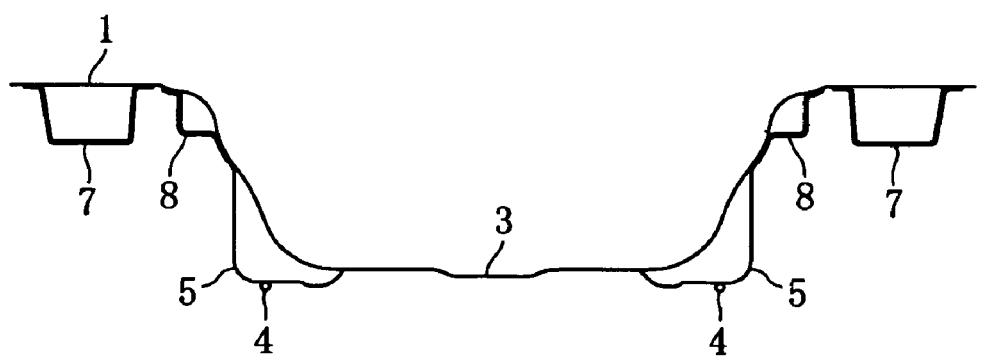
FIG. 6 is a sectional view taken along line VI-VI of FIG. 2.

As shown in FIGS. 1, 2 and 5, the first crash cans 9 are configured to be crashed with the impact loads that are transmitted via the bumper beam 1 at the vehicle rear crash and thereby absorb the impact energy. Namely, their size, shape and structure are configured to perform the proper energy absorption function. Likewise, the second crash cans 10 absorb the impact energy by being crashed with the impact loads transmitted via the bumper beam 1 at the vehicle rear crash. The width of the second crash cans 10 in the vehicle width direction is set to be about half the width of the first crash cans 9.

The flange plate 12 is of a vertical-plate shape and has the wider width than the first and second crash cans 9, 10, and provided so as to project laterally and upward relative to the first and second crash cans 9, 10. Each of the flange plates 12 has five bolt holes for connecting the tie-down-hook attaching reinforcing member 5, the rear side frame 7 and the reinforcing member 8.

A pair of tie-down-hook attaching reinforcing members 5 is attached to both-side portions of the spare tire pan 3 from its lower-end side curve portions to its upper-end portions. A pair of tie-down hooks 4 is provided at the tie-down-hook attaching reinforcing members 5. At the rear end portions of the tie-down-hook attaching reinforcing members 5 are provided extension portions 20 that extend outward. The extension portions 20 extend between the spare tire pan 3 and the reinforcing members 8 and are connected to these.

A rear end portion of each of the extension portions 20 extends to a rear end of the floor panel 1 and is bent upward there. This bent portion is inserted between the floor panel 1 and the rear end panel 2, and are connected to these. On an inside of the extension portion 20 is provided a flange portion 21 that is bent downward at a right angle. The flange portions 21, which have bolt hole 21*a*, are connected to the second crash cans 10 via the flange plates 12 with bolts 22, respectively.

Next, functions and effects of the vehicle rear body structure of an automotive vehicle will be described. At the vehicle rear crash, the first and second crash cans 9, 10 are crashed with the crash loads transmitted from the bumper beam 11 to the first and second crash cans 9, 10, the rear side frames 7 and the reinforcing members 8, so that the impact energy can be absorbed. Also, the impact energy can be also absorbed by the rear side frames 7 having their compressive deformations and the reinforcing members 8 having their compressive deformations.

Thus, since the reinforcing members 8 form the closed cross sections with the upper-end curve portions 3*b* located outside the spare tire pan 3 and the closed cross sections are located substantially at the same height-level as the rear side frames 7, the impact loads transmitted via bumper beam 11 at the vehicle rear crash can be received effectively by the rear side frames 7 and the reinforcing members 8. Thus, the impact crash can be absorbed properly by compressive deformations of the rear side frames 7 and reinforcing members 8, so absorption of the impact energy can be improved.

Also, since the reinforcing members 8 can form the closed cross sections properly by taking advantage of the upper end-side curve portions of the floor panel 1, an improper weight increase for reinforcing the vehicle rear body can be suppressed effectively.

Since there is provided the cross member 6 that is formed at the lower face of the floor panel 1 at the portion in front of the spare tire pan 3 and forms the closed cross section with the floor panel 1 and the front end portions of the reinforcing members 8 are connected to the cross member 6, the impact load transmitted to the reinforcing members 8 can be received by the cross member 6, so the absorption of the impact energy by the reinforcing members 8 can be further improved.

Further, the vehicle rear body structure further comprises a pair of first crash cans 9 that is fixed to rear end portions of the rear side frames 7 respectively, the bumper beam 11 that is attached to rear end portions of the first crash cans 9, and a pair of second crash cans 10 that is provided inside the pair of first crash cans 9, respectively, and the front ends of the second crash cans are fixed to the reinforcing members, respectively, and rear ends of the second crash cans are fixed to the bumper beam. Thereby, the impact energy absorption of the vehicle rear body structure can be further improved by the second crash cans 10, and the impact load can be transmitted surely to the reinforcing members 8 via the second crash cans 10. Herein, it is not necessary to increase the vertical width of the bumper beam improperly.

Also, there are provided the flange plates 12 that interconnect the font end portions of the first crash cans 9 and the front end portions of the second crash cans 10 and the rear ends of the rear side frames 7 and the rear ends of the reinforcing members 8 are connected to the flange plates 12, respectively. When the vehicle has the rear-oblique crash, the crash load can be transmitted from the bumper beam 11 to the rear side frame 7 via the first crash can 9, and the crash load can be also transmitted to the reinforcing member 8 via the flange plate 12. Thus, the impact energy absorption even for the vehicle rear-oblique crash can be improved.

Further, there are provided first flange portions 13, 14 and 15 at the rear ends of the rear side frames 7 and second flange portions 16 at the rear ends of the reinforcing members 8, and the first and second flange portions 13-16 are fixed to the flange members 12. Herein, the rear side frames 7 and first crash cans 9 are interconnected and the reinforcing members 8 and second crash cans 10 are interconnected. Thereby, the interconnection of the rear side frames 7 and the first crash cans 9 and the interconnection of the reinforcing members 8 and the second crash cans 10 can be provided simply, and the number of parts for the interconnections can be reduced. Thus, manufacturing costs can be lowered.

Herein, the first and second crash cans 9, 10 and the flange plates 12 may be pre-assembled to the bumper beam 11 as a bumper unit, and this bumper unit may be attached to the rear side frames 7 and the reinforcing members 8 with bolts. In this case, the productivity of assembling the vehicle rear body can be improved.

Some modifications of the above-described embodiment will be described.

1) The front end portions of the reinforcing members 8 may be connected to the cross member 6 in such a manner that portions having the closed cross sections of the reinforcing members 8 directly contact the cross member 6.

2) The tie-down-hook attaching reinforcing member 5 and the reinforcing member 8 may be made of an integrated member.

3) Any other modifications and improvements may be applied within the scope of a sprit of the present invention.

What is claimed is:

1. A vehicle rear body structure of an automotive vehicle, comprising:
    a floor panel having a spare tire pan, the spare tire pan being formed at a portion that is located near a rear end of the floor panel so as to project downward;
    a pair of rear side frames, the rear side frames being provided at a lower face of said floor panel at both sides so as to extend forward from a rear end of the vehicle; and
    a pair of reinforcing members, the reinforcing members being provided at the lower face of said floor panel at portions located outside the spare tire pan and forming with the floor panel closed cross sections that extend in a longitudinal direction of the vehicle substantially in parallel to said rear side frames,
    wherein said closed cross sections are formed with the reinforcing members and upper end-side curve portions of the floor panel located outside the spare tire pan, and the closed cross sections are located substantially at the same height-level as said rear side frames.

2. The vehicle rear body structure of an automotive vehicle of claim 1, wherein there is provided a cross member that is provided at the lower face of said floor panel at a portion in front of the spare tire pan, and front end portions of said reinforcing members are connected to the cross member.

3. The vehicle rear body structure of an automotive vehicle of claim 1, further comprising a pair of first crash cans that is fixed to rear end portions of said rear side frames respectively, a bumper beam that is attached to rear end portions of the first crash cans, and a pair of second crash cans that is provided inside said pair of first crash cans, respectively, wherein front end portions of said second crash cans are fixed to said reinforcing members, respectively, and rear end portions of said second crash cans are fixed to said bumper beam, respectively.

4. The vehicle rear body structure of an automotive vehicle of claim 3, wherein there are provided flange plates that interconnect front end portions of the first crash cans and the front end portions of the second crash cans, and the rear end portions of the rear side frames and rear end portions of the reinforcing members are connected to said flange plates, respectively.

5. The vehicle rear body structure of an automotive vehicle of claim 4, wherein there are provided first flange portions at the rear end portions of the rear side frames and second flange portions at the rear ends of the reinforcing members, and the first and second flange portions are fixed to said flange plates, whereby said rear side frames and first crash cans are interconnected and said reinforcing members and second crash cans are interconnected.

6. A vehicle rear body structure of an automotive vehicle, comprising:

a floor panel having a spare tire pan, the spare tire pan being formed at a portion that is located near a rear end of the floor panel so as to project downward;

a pair of rear side frames, the rear side frames being provided at a lower face of said floor panel at both sides so as to extend forward from a rear end of the vehicle;

a pair of reinforcing members, the reinforcing members being provided at the lower face of said floor panel at portions located outside the spare tire pan and forming with the floor panel closed cross sections that extend in a longitudinal direction of the vehicle substantially in parallel to said rear side frames, said closed cross sections being located substantially at the same height-level as said rear side frames;

a pair of first crash cans that is fixed to rear end portions of said rear side frames respectively;

a bumper beam that is attached to rear end portions of the first crash cans; and a pair of second crash cans that is provided inside said pair of first crash cans, respectively, wherein front end portions of said second crash cans are fixed to said reinforcing members, respectively, and rear end portions of said second crash cans are fixed to said bumper beam, respectively.

7. The vehicle rear body structure of an automotive vehicle of claim 6, wherein there is provided a cross member that is provided at the lower face of said floor panel at a portion in front of the spare tire pan, and front end portions of said reinforcing members are connected to the cross member.

* * * * *